United States Patent

Trask et al.

[11] Patent Number: 5,865,364
[45] Date of Patent: Feb. 2, 1999

[54] PROCESS FOR LINEAR FRICTION WELDING

[75] Inventors: Richard D. Trask, Simsbury; Susan H. Goetschius, Marlborough; Stephen A. Hilton, Vernon, all of Conn.

[73] Assignee: United Technologies Corporation, Hartford, Conn.

[21] Appl. No.: 772,536

[22] Filed: Dec. 24, 1996

[51] Int. Cl.$^6$ .......................... B23K 20/12; B23K 37/04
[52] U.S. Cl. .................. 228/212; 228/44.3; 228/112.1
[58] Field of Search .................. 228/112.1, 2.1, 228/44.3, 212

[56] References Cited

U.S. PATENT DOCUMENTS

| | | | |
|---|---|---|---|
| 4,934,583 | 6/1990 | Patsfall | 228/44.3 |
| 5,031,288 | 7/1991 | Sadler | 29/889.21 |
| 5,035,411 | 7/1991 | Damines et al. | 269/231 |
| 5,109,606 | 5/1992 | DeMichael et al. | 29/889.1 |
| 5,188,275 | 2/1993 | Daines | 228/2 |
| 5,197,190 | 3/1993 | Coolidge | 29/889.1 |
| 5,492,581 | 2/1996 | Searle | 156/73.5 |
| 5,551,623 | 9/1996 | Collot et al. | 228/112.1 |

FOREIGN PATENT DOCUMENTS

| | | |
|---|---|---|
| 0 624 418 A2 | 11/1994 | European Pat. Off. . |
| 0 669 183 A1 | 8/1995 | European Pat. Off. . |
| 2 277 896 | 11/1904 | United Kingdom . |

OTHER PUBLICATIONS

Copy of European Search Report dated Jun. 4, 1998, EPA EP 97 31 0560.

Primary Examiner—Patrick Ryan
Assistant Examiner—Jeffrey T. Knapp
Attorney, Agent, or Firm—Mark Steinberg

[57] ABSTRACT

A linear friction welding process provides two members to be joined together into a final product, where each of the members has a major outer surface, where one of the two members is a stub which is surrounded, at least in part, on its outer major surface by a collar. The stub is generally restrained without substantial restraining contact on its outer major surface by tooling, thereby eliminating the risk that tooling will cause physical or chemical damage to the final shape. Thereafter, pressure and relative movement are applied between said members to linear friction weld the members together. A collar comprises a major inner surface surrounding a portion of a major outer (lateral) surface of a member to be linear friction welded, and further comprises a radially outer surface which extends a surface to be interfaced of the member. The collar has an outer lateral surface which may be curved in order to prevent stress and cracking of the collar during linear friction welding. The inner and outer lateral collar surfaces may be generally parallel to each other, making the area of the outer radial surface of the collar small, so that less process input energy is needed to overcome the friction contributed by the collars, and so that the collars experience smaller loads during linear friction welding, making them easier to secure.

17 Claims, 5 Drawing Sheets

PROCESS FOR LINEAR FRICTION WELDING

The Government has certain rights in this invention pursuant to Contract No. F33657-91C-0007.

TECHNICAL FIELD

This invention relates to linear friction welding.

BACKGROUND ART

As known in the art, structures may be bonded together by means of linear friction welding. In such a process, a surface on one of the structures is contacted (interfaced) to a surface on the other structure. The interfacing surfaces typically have complimentary features, i.e. similar lengths and similar widths. The two parts are rubbed together, in a back and forth, somewhat linear type oscillatory manner. The axis of the oscillation is typically roughly aligned with the longitudinal (lengthwise) axis of the interface, i.e. end to end. As the parts are rubbed, compressive force is applied to place the interface under high pressure. At the interface, frictional heat is generated and material from each part changes to a molten or preferably to a plastic state. Some of this material flows out from between the parts (flash flow), resulting in gradual decrease in the thickness, i.e. the dimension in the direction in which pressure is applied (the dimension perpendicular to the interface) of the parts. When the process is terminated, flash flow ceases, and at the interface, the remaining plastic state material of each part cools and changes back to solid state, forming bonds therein and bonding the two parts together.

However, a problem exists with this process in that the bond is usually incomplete, i.e. defective, at the ends of the interface. The nature of the defect is that of a void, or notch. It occurs, in part, because the ends of the interface, roughly on the axis of oscillation, are alternatingly exposed to ambient during each oscillation cycle. While exposed, the end is not rubbed and therefore not frictionally heated. Thus, as a result of the alternating exposure, the ends are only alternatingly heated and the temperature of the ends does not get high enough to produce complete bonding.

Efforts have focused on developing processes which insure that the defect does not form within the outline of the final shape of the product. In the fabrication of original equipment, part geometries can be oversized so that the defects which form are located outside the outline of the final product. The defects are then removed as the product is machined down to its final shape. However, in repair situations, a damaged portion is removed, but the remaining portion is already at its final shape and dimension, and therefore, an oversized geometry is not a viable alternative.

One of the numerous applications for linear friction welding is that of attaching blades (airfoils) to a rotor and thereby forming an integrally bladed rotor (IBR). In such an application, a base surface on the blade is interfaced to a slightly elevated surface on the rotor. However, without preventative measures, the bond risks being defective at the blade edges, because the blade edges are situated at the ends of the interface, roughly on the oscillation axis, and therefore, the blade edges are alternatingly exposed to ambient and only alternatingly heated during oscillation. As a result, the edge temperature does not get high enough to produce complete, adequate bonding. Although the defect may not constitute a crack per se, it could mature into such during engine operation, and thus, its presence in an IBR is unacceptable.

In the prior art approach for preventing defects at the edges for IBR repairs, the damaged portion of a blade under repair is removed, e.g., by removing a longitudinal section, and flanges, or collars, are provided around the edges of the remaining portion. A pair of jaws grip the remaining (undamaged) portion, (having, as its final shape, the final shape of the repaired part), and its associated flange to secure each in place for linear friction welding. Although the undamaged portion is already joined to the IBR (as by linear friction welding), the undamaged portion is not rigid enough, side to side, and too highly cantilevered to undergo linear friction welding without the support of the jaws or similar tooling. Similar flanges and jaws are also provided to grip a replacement portion, also having as its final shape, the final shape of the repaired part, to linear friction weld it to the undamaged portion. The flanges around each portion prevent the blade edges of the other portion from being alternating exposed to ambient; thus sufficient heat is generated to achieve effective bonding. Defects may be formed in the flange region, because the flanges may be alternatingly exposed to ambient, but the flanges are subsequently machined away, along with such defect.

However, with this prior art approach, it is difficult for the jaws to securely hold the blades without causing damage to the finished shapes. First, the jaws generally cannot conform exactly to the shape of an individual blade, because the shapes of the blades vary somewhat from one another, due to normal manufacturing inaccuracies, and therefore, the jaws may cause physical damage to any particular blade when they grip it tightly. Further, high performance blades often comprise titanium, a relatively soft metal which is relatively easily marred on its surface. Such marring is highly undesirable because it adversely affects the aerodynamic performance of the blades. Still further, the jaws typically do not have the same material composition as the blades, and consequently, they can leave residual chemical deposits which thereby contaminate the surface finish. The surface finish is so critical in some applications that during fabrication, often times gloves are worn when handling the blades in order to prevent contamination of the blade surface finish.

In addition, the replacement portion is almost certain to be significantly damaged because it is solely supported by jaws gripping its finished airfoil. Unlike the remaining portion, the replacement portion is not integral to a larger structure, such as the blade disk, which provides support. Thus, the jaws grip the finished airfoil securely enough to withstand tens of thousands of pounds of pressure, and therefore, almost certainly inflicts deep imprints in the airfoil.

Another problem with prior art approaches is that the flanges tend to be large, contributing as much, or more, surface area to the interface, as that of the blade. While this may help prevent defects from forming in the blade edges, it requires excessive process input energy to overcome the friction contributed by the flanges alone, and subjects the flanges to tremendous loads during linear friction welding, making them extremely difficult to hold securely, especially in view of the fact that the same pair of jaws has to grip the both the flanges and the blade. Prior art flanges also have sharp, orthogonal edges, making the flanges more susceptible to stress and cracking during linear friction welding.

DISCLOSURE OF THE INVENTION

To overcome the problems described above, the linear friction welding process of the present invention provides two members which are to be joined together into a final product, where each of the members has a major outer surface and a surface to be interfaced, and where one of the two members is a stub which is surrounded, at least in part, on its outer major surface by a collar. The stub is generally restrained without substantial restraining contact on its outer major surface by tooling. Thereafter, pressure and relative movement are applied between said members to linear friction weld the members together. Such a process eliminates the need to use tooling to grip any surfaces of the final part shape, thus eliminating the risk that tooling will cause physical or chemical damage to the final shape. At least a portion of the major outer surface of the stub may be generally coextensive with that of the final product. The stub member should generally be rigid enough to undergo linear friction welding without any substantial restraining support of the jaws or similar tooling, the stub typically having a radial thickness which is less than about three times its width, preferably less than about one inch, more preferably less than its width. The collar, which reduces alternating exposure to ambient of the other members' interface surface, may comprise a band having curved major inner and outer (lateral) surfaces. The inner and outer major collar surfaces may be generally parallel to each other making the collar generally uniform in width. The collar may further comprises a base upon which the band is upstanding. The surfaces to be interfaced on the stub and the collar are preferably substantially coplanar with each other. The other member's interface surface may be oversized, integrally or with a collar, preferably making it complimentary to that of the stub, to reduce alternating exposure to ambient of the stub's interface surface.

In a second aspect of the present invention, a collar comprises major inner and outer lateral surfaces, the major inner surface surrounding a portion of a major outer (lateral) surface of a member to be linear friction welded. The member has a surface to be interfaced for linear friction welding with a complementary member, the radially outer surface of the collar providing an extension to the area of the surface of the member to be interfaced. The outer lateral surface may be curved in order to prevent stress and cracking of the collar during linear friction welding. The inner and outer lateral collar surfaces may be generally parallel to each other, making the area of the outer radial surface of the collar small, and somewhat uniform in width, so that less process input energy is needed to overcome the friction contributed by the collars, and so that the collars experience smaller loads during linear friction welding, making them easier to secure. The collar may have a radial thickness which is less than one inch. The area of the radial outer surface of the collar is typically less than that of the member's surface to be interfaced, preferably less than one half that of the member.

BEST MODE EMBODIMENT FOR CARRYING OUT THE INVENTION

Figure 1:
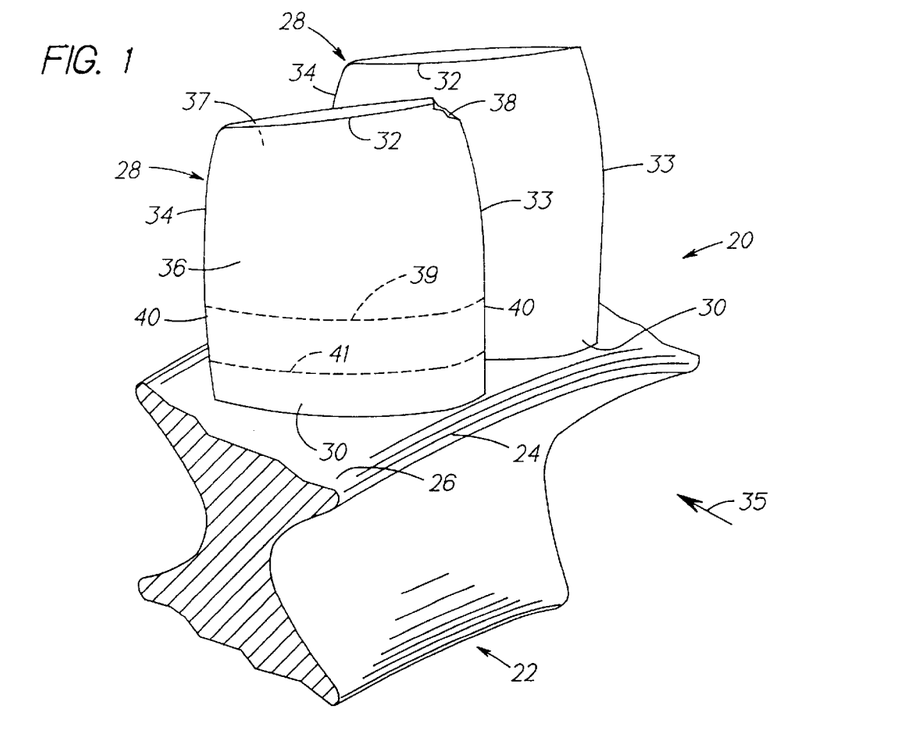
FIG. 1 is a fragmentary perspective view of an integrally bladed fan rotor for a gas turbine engine with which the method and collars of the present invention may be used to repair.

The present invention is disclosed with respect to various embodiments for use with a first stage integrally bladed fan rotor of the type illustrated in FIG. 1.

Referring to FIG. 1, an integrally bladed fan rotor 20 has a disk 22 with a platform 24 having a radially outer surface 26. Blades (airfoils) 28 extend from the radial outer surface 26 of the disk 22. It will be understood that the blades 28 are two of a plurality of such blades attached to the disk 22. Each of the blades 28 has a base 30 and a tip 32, as well as a leading edge 33 and a trailing edge 34, relative to a gas flow path 35. One of the blades 28 has a damaged portion 38.

Figure 2:
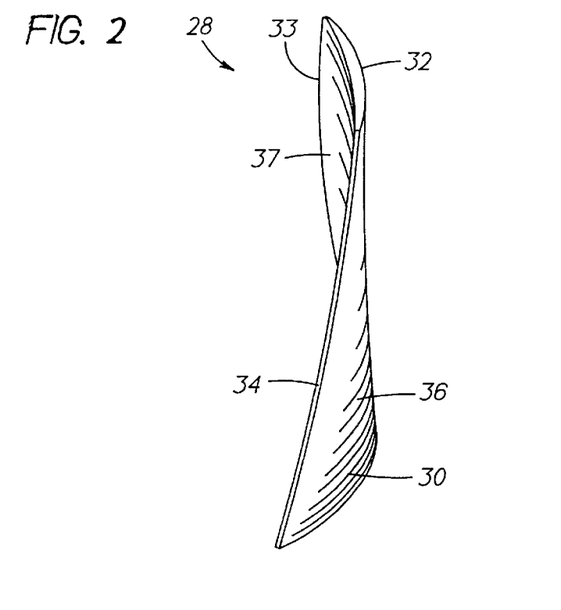
FIG. 2 is a perspective view of one of the blades shown in FIG. 1.

Referring to FIG. 2, the blade 28 has an intricately twisted and bent shape, which provides the blade with the desired aerodynamic properties. One side (suction side) 36 of the blade is convex and the other (pressure side) 37 is concave. Ideally each of the plurality of blades has exactly the same shape, but realistically, the shapes of the blades vary somewhat from one another, due to normal manufacturing inaccuracies.

The blade 28 is typically comprised of a material which is relatively light weight yet sufficiently strong mechanically, such as a titanium alloy. Nevertheless, the blade 28 must be handled carefully during fabrication and repair, to insure that the blade is not distorted or damaged. Furthermore, to prevent residual chemical deposits and surface finish contamination. any metal tools which contact the blade 28 preferably comprise the same, or similar, material to that of the blade.

Referring again to FIG. 1, the pressure side 37 of the blade 28 is cantilevered toward the surface 26 of the platform 24. While the cantilevering is ideally the same for each of the blades, realistically, it too varies from blade to blade.

Figure 3:
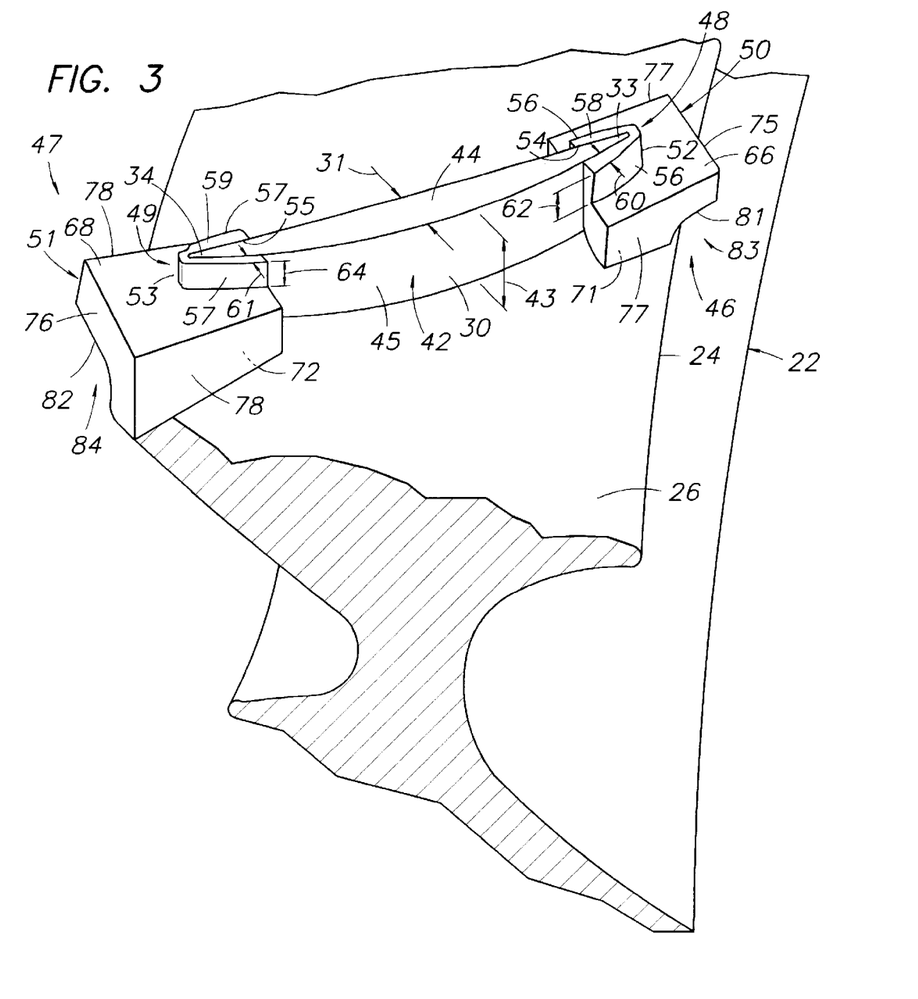
FIG. 3 is a fragmentary perspective view of the integrally bladed fan rotor of FIG. 1 and a first embodiment of the collar of the present invention, wherein a portion of the damaged blade has been removed.

The present invention overcomes the prior art problems of blade surface damage and the inefficiencies of prior art collars described above. In a first embodiment of the present invention, the major portion of the blade 28 located above the dotted line 41 is removed. Referring now to FIG. 3, with the major portion, including the damaged portion, of the blade removed, only a stub portion 42 of the blade, i.e. a portion which is rigid enough to undergo linear friction welding without any substantial restraining support of the jaws or similar tooling, remains. The stub typically has a radial thickness 43, or height, having a magnitude which is less than about three times that of its width 31. Here, the stub radial thickness 43 is preferably about one inch or less, more preferably less than about one times its width 31.

The stub 42 preferably extends from the leading edge 33 to the trailing edge 34, and the radial thickness 43, or height, is preferably generally uniform. The stub 42 comprises a radially outer surface 44, which constitutes a portion of a surface to be interfaced, whereupon linear friction welding of an extension member to form a final product is to be initiated, and a major outer (lateral) surface 45, which is preferably generally coextensive with the outer lateral surface of the final product, comprising the pressure and suction side surfaces 36, 37 (FIGS. 1, 2) and the leading and trailing edges 33, 34.

Collars 46, 47 are provided at the leading and trailing edges 33, 34 of the stub 42.. The collars 46, 47 each comprise a partial band 48, 49 and a band base 50, 51. Preferably, each band 48, 49 is generally V-shaped, having a bifurcating end 52, 53, a major inner (lateral) surface 54, 55, a major outer (lateral) surface 56, 57, and a radially outer surface 58, 59. The inner surfaces are preferably adapted to make substantially uniform contact with the respective edge 33, 34 and the sides 36, 37 (FIGS. 1, 2) of the stub 42. The radially outer surfaces 58, 59, constitute the other portions of the surface to be interfaced for linear friction welding, and are preferably substantially flush, or substantially coplanar, with the radially outer surface 44 of the stub 42, i.e. generally at the same height as each other relative to the platform surface 26. The major outer surfaces 56, 57 are curved at the bifurcating ends 52, 53, to eliminate sharp corners that could otherwise develop stress during linear friction welding and ultimately crack.

The geometry of the bands 48, 49 should be suitable to reduce or eliminate the alternating exposure of the edges on an extension blade member which to be linear friction welded to the stub, so that the temperature of the edges on the extension member gets high enough to achieve complete bonding, i.e. no defects at the edges. In addition, the bands 48, 49 preferably provide circumferential, (lateral, pressure side to suction side) support for the stub 42, to keep the cantilevered stub from bending toward the platform 24 surface 26 during linear friction welding. However, it is desirable to keep the geometry of the bands, particularly those parameters which affect the area of the radially outer surfaces 58, 59, as small as possible, i.e. no larger than necessary. This is because the magnitude of the load experienced by the bands during linear friction welding are proportional to the magnitude of the area of the radially outer surfaces 58, 59. Higher loads make it more difficult to hold the band in place. As a result, the outer lateral surfaces 56, 57 are generally parallel to the inner lateral surfaces 54, 55, such that the bands 48, 49 are generally uniform in width 60, 61 and generally conform to the major outer surface 45 of the stub 42. This makes the area of the radial outer surfaces 58, 59 of the bands small, so that less process input energy is needed to overcome the friction contributed by the bands, and so that the collars experience smaller loads during linear friction welding, making them easier to secure. The total area of the radial outer surfaces 58, 59 is typically less than that of the radially outer surface 44 of the stub 42, preferably less than one half that of stub 42 radially outer surface 44, more preferably less than one quarter that of the stub 42 radially outer surface 44, ideally, less than that of the portion of the radially outer surface 44 which is partially enclosed by the bands.

The bands 48, 49 have radial thicknesses 62, 64 (heights) which will gradually decrease during LWF. The initial radial thicknesses 62, 64 are preferably at least as great as the expected decrease, in order to prevent the linear friction welding interface from reaching the radially outer surfaces 66, 68 of the bases 50, 51,. However, the thicknesses 62, 64 are preferably not so large as to make the bands 48, 49 susceptible to breaking or bending during linear friction welding. For example, in the preferred embodiment, the radial thickness 62, 64 is about 0.175 inches and the expected decrease in the thickness 62, 64, is about 0.075, so that the radial thickness is on the order of about 0.100 inches greater than the expected decrease in the thickness. Furthermore, for ease in controlling linear friction welding parameters, it is desirable to have the combined area of the longitudinal cross section of the stub edge and collar band be relatively constant as the thickness decreases. This is preferably achieved, by making the outer surfaces lateral 56, 57 roughly perpendicular to the stub 42 radially outer surface 44, (the plane of the linear friction welding interface (weld plane)).

Figure 4:
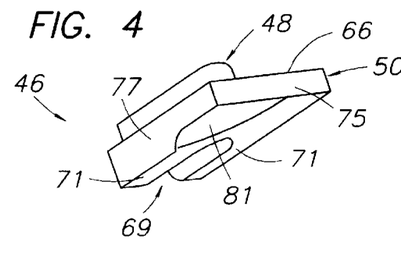
FIG. 4 is a perspective view of the leading edge collar of FIG. 3.
Figure 5:
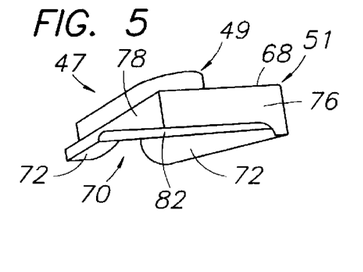
FIG. 5 is a perspective view of the trailing edge collar of FIG. 3.

Each band 48, 49 is supported by, i.e. upstanding or extending from, a radially outer surface 66, 68 of its respective base 50, 51. Referring now to FIGS. 3, 4, 5, the bases 50, 51 have somewhat rectangular plate-like geometry and V-shaped slots 69, 70 for receiving the stub 42. The V-shaped slots 69, 70 are large enough to prevent contact between the stub 42 and the bases 50, 51. Thus, the bands 48, 49 contact the stub 42 but the bases do not. The bases 50, 51 further comprise radially inner surfaces 71, 72 adapted (contoured) to rest on the radially outer surface 26 of the platform 24. Each base 50, 51 is preferably held in place by means of associated tooling 73, 74 (FIG. 6) which provides longitudinal support for the base on a longitudinal end surface 75, 76, and lateral support on a pair 77, 78 of opposite circumferential surfaces. The tooling 73, 74 (FIG. 6) is rigidly connected to fixturing 79, 80 (FIG. 6) which hold the disk 22. The radially inner surfaces 71, 72 are preferably notched, or scalloped, 81, 82 to provide clearances 83, 84 with respect to the platform 24, to permit the fixturing 79, 80 (FIG. 6) access to the platform 24.

The bands 48, 49 may be joined to their respective base 50, 51 by such means as brazing, or, to reduce cost, integrally fabricated as one piece, preferably in two steps. First, a rough machined version of the collar is produced by such means as wire electro discharge machining (wire EDM, which requires a computer and a computer model of the collar). The rough version is subsequently precision machined, for example by milling, in order to obtain the best possible fit for the particular blade. Depending on the application, casting, machining, forging, rolling, and stamping, and combinations thereof, may also be used. The two step process is preferred because each of the plurality of the blades has a somewhat, different shape and orientation, although some application may not require such precision. The collar preferably comprises a relatively rigid material, similar in composition to that of the stub, which may include but is not limited to titanium alloys and nickel alloys, thereby allowing the collars to secure the stub blade portion 42 without causing physical or chemically damage. It will be obvious that if a compliant material is used, or contact with the blade is not desired, the precision machining step may not be necessary.

Figure 6:
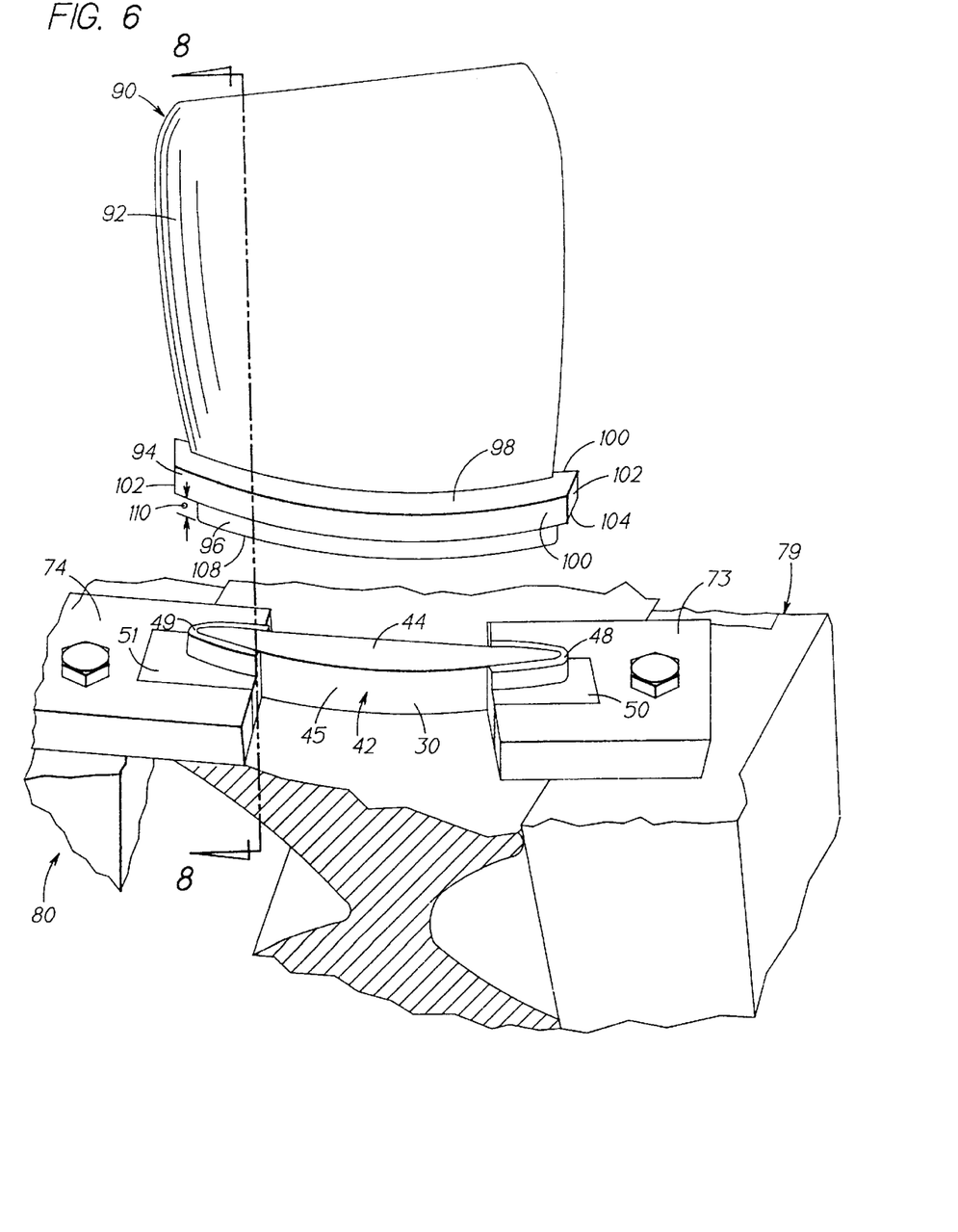
FIG. 6 is a fragmentary perspective view of the integrally bladed fan rotor, stub, and collar of FIG. 3, with an extension member and tooling for holding the collars.

Referring now to FIG. 6, an extension member 90 comprises a blade 92 which has as its final shape, the final shape of the repaired blade, a flange 94 and an end 96, which are all integral to the extension member 90. In repairing the damaged 38 blade 28 (FIG. 1), the flange 94 provides the means for holding the extension member 90 and the end 96 is joined to the stub 42. The flange 94 has a radially outer surface 98 which receives the linear friction welding pressure force, a pair 100 of opposite circumferential surfaces, a pair 102 of opposite longitudinal surfaces which preferably receive the linear friction welding oscillation forces, and a radially inner surface 104, all of which are substantially orthogonal to each other.

Figure 7:
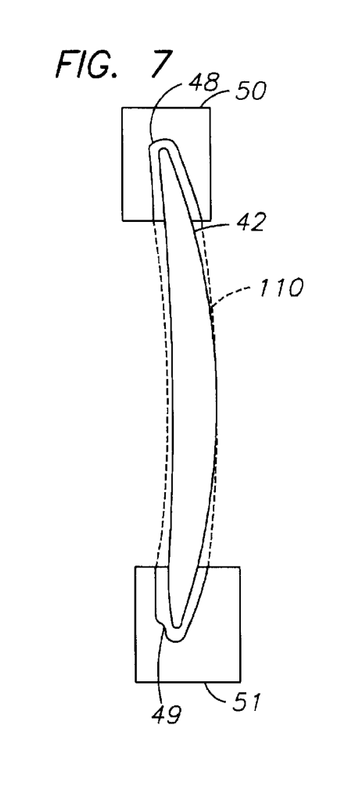
FIG. 7 is a plan view of the integrally bladed fan rotor and collar of FIG. 3 superimposed with a dotted line showing the relative shape of the edge of the extension member of FIG. 6.

The end 96 has a radially inner surface 108 that is complementarily shaped, similar to, but not necessarily exactly the same as, the aggregation of the radially outer surfaces 44, 58, 59 of the stub 42 and bands 48, 49 (see FIG. 7). If the surfaces are not complimentary, the linear friction welding oscillation can become obstructed as the thicknesses of the parts decrease, potentially disturbing the interface. To provide the complimentary shape, the end 96 is preferably integrally oversized, although collars could be used instead. The end 96 has a radial thickness 110 which should be large enough in magnitude to prevent the linear friction welding interface from reaching the radially inner surface 104 of the flange 94, but not so large as to make the end 96 susceptible to breaking or bending during linear friction welding. For the repairing the blade 28 (FIG. 1), the radial thickness 110 is on the order of about 0.100 inches greater than the expected decrease in thickness 110 due to linear friction welding.

Figure 8:
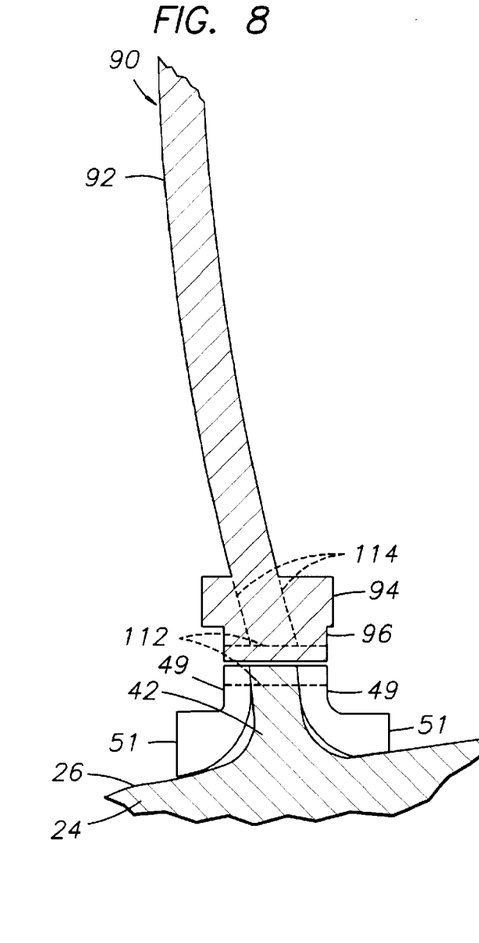
FIG. 8 is a fragmentary perspective cross section of the integrally bladed fan rotor and the trailing edge collar of FIG. 3, and the replacement blade of FIG. 6, in the direction of 8—8, with the replacement blade aligned with and contacting the collar in preparation for linear friction welding.

Referring now to FIG. 8, in preparation for linear friction welding, the extension member 90 is brought into contact with the stub 42 and bands 48 (FIGS. 3, 4, 6), 49. During linear friction welding, tooling does not restrain the members on any finished surfaces, thus, there is no risk of physical or chemical damage to the blade from such tooling. The collars are smaller yet easier to hold than those used in the prior art approach. All the material between dotted lines 112 gradually changes to a plastic state and flows out from between the parts (flash flow), thereby reducing the radial thickness of the extension member 90, the stub 42 and the bands 48(FIGS. 3, 4, 6), 49. The collars prevent the edges of the extension member from being alternatingly exposed to ambient. The oversized end 96 of the extension member 90 prevents alternating exposure of the stub edges 33, 34. Dotted lines 114 indicate the final shape of the oversized extension member 90.

Figure 9:
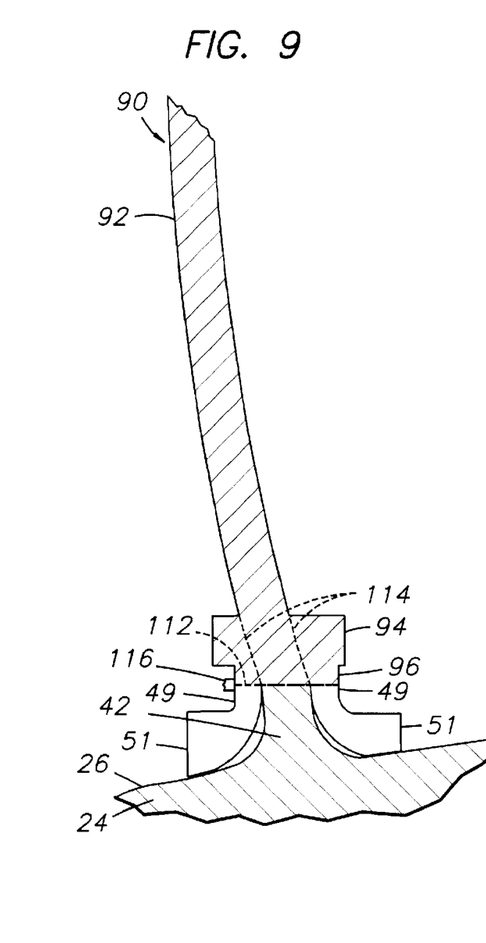
FIG. 9 is a fragmentary perspective cross section of the integrally bladed fan rotor, the trailing edge collar, and the replacement blade of FIG. 8, in the direction of 8—8, after linear friction welding.

Referring now to FIG. 9, when the linear friction welding process is complete, the parts are bonded at dotted line 112. The bond is complete at the blade edges 33, 34 (FIGS. 1–3), i.e. no defects, and the blades portions have not been physically or chemically damaged by contact with any tooling other than the collars. Although flash flow 116 is shown on only on side, similar flash flow occurs all around. Extension member 90 material outside the dotted lines 114 is removed, as are the bands 48(FIGS. 3, 4, 6), 49, the bases 50(FIGS. 3, 4, 6), 51, and the flash flow 116.

Figures 10, 11:
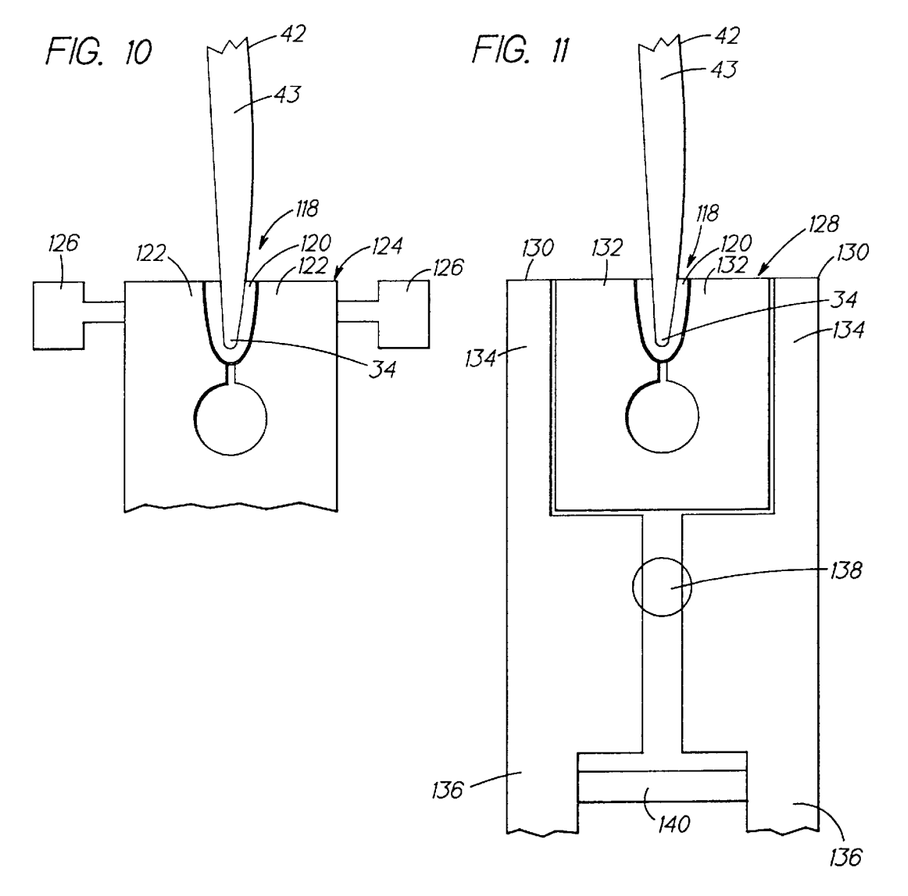
FIG. 10 is a fragmentary plan view of the integrally bladed fan rotor of FIG. 3 and a second embodiment of the collar of the present invention with associated tooling.
FIG. 11 is a fragmentary plan view of the integrally bladed fan rotor and second embodiment of FIG. 10 with alternate tooling.

Referring now to FIG. 10, a second embodiment for a trailing edge collar 118 comprises only a band 120, i.e. no base. The band 120 is preferably comprised of a cold formable material. The band 120 is secured to and forced into conformance with the edge 34 of the stub 42 by a set of jaws 122 flexibly, movably integrated into tooling 124. The tooling 124 further comprises an actuator 126 for applying force on the jaws 122 to force the jaws into closer proximity with each other, and thereby force the band 120 into conformance with the edge 34. Although not shown, the tooling is attached to the fixture 80 (FIG. 6) holding the disc 22 (FIG. 6). The band 120 has a radial thickness which is large enough in magnitude to prevent the linear friction welding interface from reaching the surface of the tooling 124, but not so large as to make the band 120 susceptible to breaking or bending during linear friction welding. Although not shown, another collar with tooling are similarly provided at the leading edge 33 (FIGS. 1–3). As with the first embodiment, this embodiment does not need to restrain the members on any finished surfaces with tooling and thus, it eliminates the risk of physical or chemical damage to the blade from such tooling.

Referring now to FIG. 11, means 130 for actuating the jaws 132 are a set of clamps each having two ends 134, 136, and rotatably connected at a pivot 138. The clamps may be forced apart at one 136 of their ends by a spreader 140, which causes the other 134 of the ends to pivot toward each other, and thereby forcing the jaws 132, which are similar to the jaws 122 illustrated and described with respect to FIG. 10, into closer proximity with each other. Although not shown, the alternate tooling is attached to the fixture 80 (FIG. 6) holding the disc 22 (FIG. 6). Another collar with tooling (not shown) are similarly provided at the leading edge 33 (FIGS. 1–3).

Although the present invention discloses the collar of the present invention in contact with the stub and resting on the radially outer surface of the platform, the present invention is not so limited. So long as the collar is in the proximity of the stub and secured, the collar need not contact the stub; plastic state material from the interface may fill and seal small gaps between the collar and the stub. The collar may possibly be positioned off of the surface of the platform. This possibility may be particularly suited to situations where the blade portions is more than a stub. However, because of the large pressure forces associated with linear friction welding, some radial support for the collar may be necessary.

Furthermore, while the best mode of the present invention is disclosed with regard to a blade stub and an extension member, the present invention may be used with almost any size blade portion on the disc and any extension blade portion, depending on the application and the available tooling. The stub need not have uniform height. The extension member may be a replacement portion but is not so limited. For example, the present invention may also be used, where in an OEM situation it is not possible to provide an oversized elevated surface on the rotor disc for the initial blade.

Although the present invention is disclosed with respect to a best mode embodiment for use in linear friction welding blades with edges, it should be recognized that the present invention may be suitably adapted for applications having structures of any shape.

While the particular invention has been described with reference to embodiments for use in repairing an integrally bladed fan rotor, this description is not meant to be construed in a limiting sense. It is understood that various modifications of the above embodiments, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. A collar for surrounding a portion of a major outer surface of a member to extend the area of a surface to be interfaced for linear friction welding, said collar comprising:

a major inner surface which surrounds the portion of the major outer surface of the member;

a major outer surface; and a radially outer surface joining said major inner and said major outer surfaces, said radially outer surface extending the area of the surface to be interfaced for linear friction welding, wherein said radial outer surface has an area generally less than that of the member's surface to be interfaced.

2. The collar of claim 1 wherein said area of said radial outer surface of said collar is generally less than that of the portion of the radially outer surface partially enclosed by said collar.

3. A collar for surrounding a portion of a major outer surface of a member to extend the area of a surface to be interfaced for linear friction welding, said collar comprising:

a major inner surface which surrounds the portion of the major outer surface of the member;

a major outer surface which is curved; and a radially outer surface joining said major inner and said major outer surfaces, said radially outer surface extending the area of the surface to be interfaced for linear friction welding.

4. The collar of claim 3 wherein said inner and outer major surfaces and said radially outer surfaces define a band, said collar further comprising a base, from which said band extends radially outwardly.

5. The collar of claim 3 wherein said major inner and outer surfaces of said collar are generally parallel to each other.

6. The collar of claim 3 wherein said radial outer surface of said collar has an area generally less than that portion of the member's surface to be interfaced which is partially enclosed by said collar.

7. The collar of claim 3 wherein said radial outer surface of said collar has an area generally less than one half of that of the member's surface to be interfaced.

8. The collar of claim 3 wherein said radial outer surface of said collar has an area generally less than one quarter of that of the member's surface to be interfaced.

9. A process for use in linear friction welding, the process comprising:

providing a two members to be joined to one another at an interface by linear friction welding into a final product, each of said two members having a surface to be interfaced with a corresponding surface of the other member, one of said members being a stub;

surrounding at least a portion of said surface of said stub member with a collar having a surface to be interfaced with a surface of the other member; and restraining said stub member without making substantial restraining contact with the outer surface thereof with any tooling not having a surface to be interfaced with a surface of the other member.

10. The process of claim 9 wherein said stub and said collar each have a radially outer surface and wherein said radially outer surfaces are substantially coplanar.

11. The process of claim 9 wherein said collar comprises a base and a band upstanding from said base and having a width lesser in magnitude than that of said base.

12. The process of claim 9 wherein the other of said members includes a flange for restraining said one member without making substantial restraining contact with the final shape surface thereof with any tooling.

13. The process of claim 12 wherein said band conforms generally to a portion of said outer surface of said stub.

14. The process of claim 9 wherein said stub has a radial thickness and a width and wherein the magnitude of said radial thickness is generally less than three times that of its width.

15. The process of claim 14 wherein the magnitude of said radial thickness of said stub is generally less than its width.

16. The process of claim 9 wherein said collar comprises a band having a curved outer major surface.

17. The process of claim 16 wherein said band further comprises a major inner surface which is generally parallel to said major outer surface of said band.

* * * * *